US010664577B2

(12) United States Patent
Hoffmann et al.

(10) Patent No.: US 10,664,577 B2
(45) Date of Patent: *May 26, 2020

(54) AUTHENTICATION USING DELEGATED IDENTITIES

(71) Applicant: INTERNATIONAL BUSINESS MACHINES CORPORATION, Armonk, NY (US)

(72) Inventors: Philipp Hoffmann, Hamburg (DE); David Lebutsch, Tuebingen (DE); Martin Oberhofer, Bondorf (DE); Daniel Pittner, Steinenbronn (DE); Mehmet Uenluetepe, Herrenberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,597

(22) Filed: Apr. 23, 2019

(65) Prior Publication Data
US 2019/0251235 A1 Aug. 15, 2019

Related U.S. Application Data

(63) Continuation of application No. 15/817,424, filed on Nov. 20, 2017.

(51) Int. Cl.
*G06F 21/00* (2013.01)
*G06F 21/31* (2013.01)
(Continued)

(52) U.S. Cl.
CPC .............. *G06F 21/31* (2013.01); *G06F 21/33* (2013.01); *G06F 21/41* (2013.01); *H04L 9/3226* (2013.01); *H04L 63/0815* (2013.01)

(58) Field of Classification Search
CPC .......... G06F 21/31; G06F 21/33; G06F 21/41; H04L 63/10; H04L 63/102;
(Continued)

(56) References Cited

U.S. PATENT DOCUMENTS

2003/0005299 A1* 1/2003 Xia ........................ G06F 21/31
713/171
2006/0282681 A1* 12/2006 Scheidt ................ G06F 21/602
713/186
(Continued)

FOREIGN PATENT DOCUMENTS

WO 2017079795 A1 5/2017
WO 2017127564 A1 7/2017

OTHER PUBLICATIONS

Amit "12 Companies Leveraging Blockchain for Identification and Authentication" Let's Talk Payments; dated Mar. 28, 2016; downloaded Oct. 25, 2017; https://letstalkpayments.com/12-companies-leveraging-blockchain-for-identification-and- . . . ; 3 pgs.
(Continued)

*Primary Examiner* — Yogesh Paliwal
(74) *Attorney, Agent, or Firm* — Cantor Colburn LLP; Reza Sarbakhsh

(57) ABSTRACT

The invention relates to a computer-implemented method for user authentication using a cryptographically secured register. An authentication request for authenticating the user is received. The user is authenticated using a root identity of the user. A successful authentication requires receiving a credential assigned to a root identifier of the root identity of the user. An authentication context of the requested authentication is identified. One of the one or more delegated identities assigned to the root identity of the user and assigned to the identified authentication context is identified. In response to a successful authentication of the user, an authentication token is issued confirming the suc-
(Continued)

cessful user authentication and identifying the successfully authenticated user by the delegated identifier of the identified delegated identity.

17 Claims, 7 Drawing Sheets

(51) Int. Cl.
  *G06F 21/33* (2013.01)
  *H04L 29/06* (2006.01)
  *G06F 21/41* (2013.01)
  *H04L 9/32* (2006.01)
(58) Field of Classification Search
  CPC ............ H04L 63/0807; H04L 63/0884; H04L 9/3226; H04L 63/0815; H04L 67/306; H04W 12/06
  See application file for complete search history.

(56) References Cited

U.S. PATENT DOCUMENTS

| | | | |
|---|---|---|---|
| 2017/0046698 | A1 | 2/2017 | Haldenby et al. |
| 2017/0111175 | A1 | 4/2017 | Oberhauser et al. |
| 2017/0149560 | A1 | 5/2017 | Shah |
| 2018/0101684 | A1* | 4/2018 | Murphy ................ G06F 21/602 |

OTHER PUBLICATIONS

Arun, Jai Singh "Reimagining the Future of Identity Management With Blockchain", dated Mar. 7, 2017; URL: https://securityintelligence.com/reimagining-the-future-of-identity-management-with-blockchain/; 5 pgs.

Bitium Blockchain Single Sign-On; downloaded on Nov. 15, 2017; https://www.bitium.com/blockchain-single-sign-on-sso-provider; 5 pgs.

Blockchain—My Wallet' Securely manage access to Blockchain—My Wallet; downloaded Jun. 29, 2017; URL: https://www.meldium.com/apps/blockchain-my-wallet-single-sign-on; 2 pgs.

Haire, Brendan "A Solution to SSO Authentication and Identity Management: Lessons Learned" May 10, 2013; 6 pgs.

Hoffmann, Philipp et al., "Authentication Using Delegated Identities" U.S. Appl. No. 15/817,424, filed Nov. 20, 2017.

IBM "List of IBM Patents or Patent Applications Treated As Related"; Date Filed: Apr. 23, 2019, 2 pages.

Kokoris-Kogias, Eleftherios et al., "Managing Identities Using Blockchains and CoSi"; downloaded from Internet URL: https://www.securityweek2016.tu-darmstadt.de/fileadmin/user_upload/Group_securityweek2016/pets2016/1_Managing_identities_bryan_ford_etc.pdf; 2016; 2 pgs.

Moffatt, Simon "Identity Relationship Management, Access Management, blockchain" 2016 ForgeRock; URL: https://forum.forgerock.com/2016/06/blockchain-identity-access-reque . . . ; 3 pgs.

SAASPASS Blockchain Google Authenticator with SAASPASS Two Step Verification (2 Step); downloaded Jun. 29, 2017; URL: https://saaspass.com/totp/blockchain-google-authenticator-two-step-verification-2-one-time-password . . . ; 5 pgs.

SML Blockchain Single Sign-On (SSO) SAML 2.0 Blockchain Provider "SAML for Blockchain" downloaded Jun. 29, 2017; URL: https://www.bitium.com/blockchain-saml-provider; 6 pgs.

Wikipedia Delegation (computer security); downloaded Oct. 25, 2017; https://en.wikipedia.org/wiki/Delegation_%28computer_security%29; 2 pgs.

International Search Report for International Application No. PCT/EP2018/081710 dated Mar. 1, 2019; 11 pgs.

Pashalidis, Andreas et al. "A Taxonomy of Single Sign-On Systems", Information Security and Privacy—8th Australasian Conf., ACISP 2003, Jul. 9-11, 2003, Proceedings; Springer-Verlag, retrieved from: pure.rhul.ac.uk/portal/en/publications/a-taxonomy-of-single-signon-systems(d6829e93-d59b-4a45-be4e-a670321cd416).html; pp. 249-264.

* cited by examiner

AUTHENTICATION USING DELEGATED IDENTITIES

DOMESTIC PRIORITY

This application is a continuation application of the legally related U.S. Ser. No. 15/817,424 filed Nov. 20, 2017, the contents of which are incorporated by reference herein in their entirety.

BACKGROUND

The present disclosure relates to the field of electronic data processing and, more specifically, to a computer-implemented method for user authentication using a cryptographically secured register.

Authentication is a basic component of access control to computer systems as well as to resources provided by computer systems. In order to ensure that only authorized users gain access, an authentication procedure is required to establish with some degree of confidence the identity of a user in order to grant privileges established for the respective identity.

However, authentication procedures via networks may create technical challenges, because of the need to establish and present confidence for user identities remotely over a network. This may in particular be the case in context of a network indented to enable a ubiquitous access to shared computer systems as well as resources provided by these systems. A user may face the requirement to authenticate to a plurality of independent computer systems or independent resources provided by those systems, like applications. In order to authenticate to each of these computer systems or applications, the user may use individual authentication data in order to authenticate to the computer systems or applications. However, for a growing number of computer systems or software systems such an authentication approach on an individual level may become increasingly impractical.

In order to facilitate the authentication for multiple related, yet independent, software or hardware systems, single sign-on (SSO) may be implemented. Using SSO, a user is enabled to authenticate with a single set of authentication data to a connected system or systems without using different authentication data. SSO may be implemented using SAML (Security Assertion Markup Language), which is an open standard for exchanging authentication data between parties. The SAML specification defines three roles: a principal, an identity provider, and a service provider. When the principal requests a service from the service provider, the service provider requests an authentication assertion from the identity provider. The identity provider authenticates the principal and provides the authentication assertion to the service provider. On the basis of this assertion, the service provider can make an access control decision, i.e. decide whether to perform some service for the connected principal.

Single sign-on is relatively easy to accomplish within a security domain ensuring a relationship of trust between identity provider and service provider but extending SSO across security domains becomes challenging. Hence, there is a constant need to improve the performance of user authentication.

SUMMARY

Various embodiments provide a method for user authentication using a cryptographically secured register, a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a computer-implemented method for user authentication using a cryptographically secured register. The cryptographically secured register comprises a root identity of the user. The root identity comprises a root identifier and a credential assigned to the root identifier for authenticating the user. The cryptographically secured register further comprises one or more delegated identities assigned to the root identity. Each of the delegated identities comprises a delegated identifier and is assigned to an authentication context.

The method comprises the following: An authentication request for authenticating the user is received. The user is authenticated using the root identity of the user. A successful authentication requires receiving the credential assigned to the root identifier of the root identity of the user. An authentication context of the requested authentication is identified. One of the one or more delegated identities assigned to the root identity of the user and assigned to the identified authentication context using the cryptographically secured register is identified. In response to a successful authentication of the user using the root identity, an authentication token is issued confirming the successful user authentication and identifying the successfully authenticated user by the delegated identifier of the identified delegated identity.

In a further aspect, the invention relates to a method which further comprises assigning an additional delegated identity to the root identity. The additional delegated identity comprises an additional delegated identifier and is assigned to an additional authentication context. The additional authentication context depends on a further root identity. The assigning comprises receiving a request for assigning the additional delegated identity. The additional authentication context of the additional delegated identity is checked. In case the additional authentication context depends on the further root identity, the additional delegated identity assigned to the root identity is stored in the cryptographically secured register in response to receiving an approval of the additional delegated identity from a further user successfully authenticated using the further root identity on which the additional authentication context depends.

In a further aspect, the invention relates to a computer program product comprising a non-volatile computer-readable storage medium having computer-readable program code embodied therewith. The computer-readable program code is configured to implement a method for user authentication using a cryptographically secured register. The cryptographically secured register comprising a root identity of the user. The root identity comprises a root identifier and a credential assigned to the root identifier for authenticating the user. The cryptographically secured register further comprises one or more delegated identities assigned to the root identity. Each of the delegated identities comprises a delegated identifier and is assigned to an authentication context.

The method implemented by the computer-readable program code comprises the following: An authentication request for authenticating the user is received. The user is authenticated using the root identity of the user. A successful authentication requires receiving the credential assigned to the root identifier of the root identity of the user. An authentication context of the requested authentication is identified. One of the one or more delegated identities assigned to the root identity of the user and assigned to the identified authentication context using the cryptographically secured register is identified. In response to a successful authentication of the user using the root identity, an authentication token is issued confirming the successful user authentication and identifying the successfully authenticated user by the delegated identifier of the identified delegated identity.

In a further aspect, the invention relates to a computer system for user authentication using a cryptographically secured register. The cryptographically secured register comprises a root identity of the user. The root identity comprises a root identifier and a credential assigned to the root identifier for authenticating the user. The cryptographically secured register further comprises one or more delegated identities assigned to the root identity. Each of the delegated identities comprises a delegated identifier and is assigned to an authentication context.

The computer system is configured for executing the following: An authentication request for authenticating the user is received. The user is authenticated using the root identity of the user. A successful authentication requires receiving the credential assigned to the root identifier of the root identity of the user. An authentication context of the requested authentication is identified. One of the one or more delegated identities assigned to the root identity of the user and assigned to the identified authentication context using the cryptographically secured register is identified. In response to a successful authentication of the user using the root identity, an authentication token is issued confirming the successful user authentication and identifying the successfully authenticated user by the delegated identifier of the identified delegated identity.

BRIEF DESCRIPTION OF THE DRAWINGS

In the following, embodiments of the invention are explained in greater detail, by way of example only, making reference to the drawings in which.

DETAILED DESCRIPTION

Figure 1:
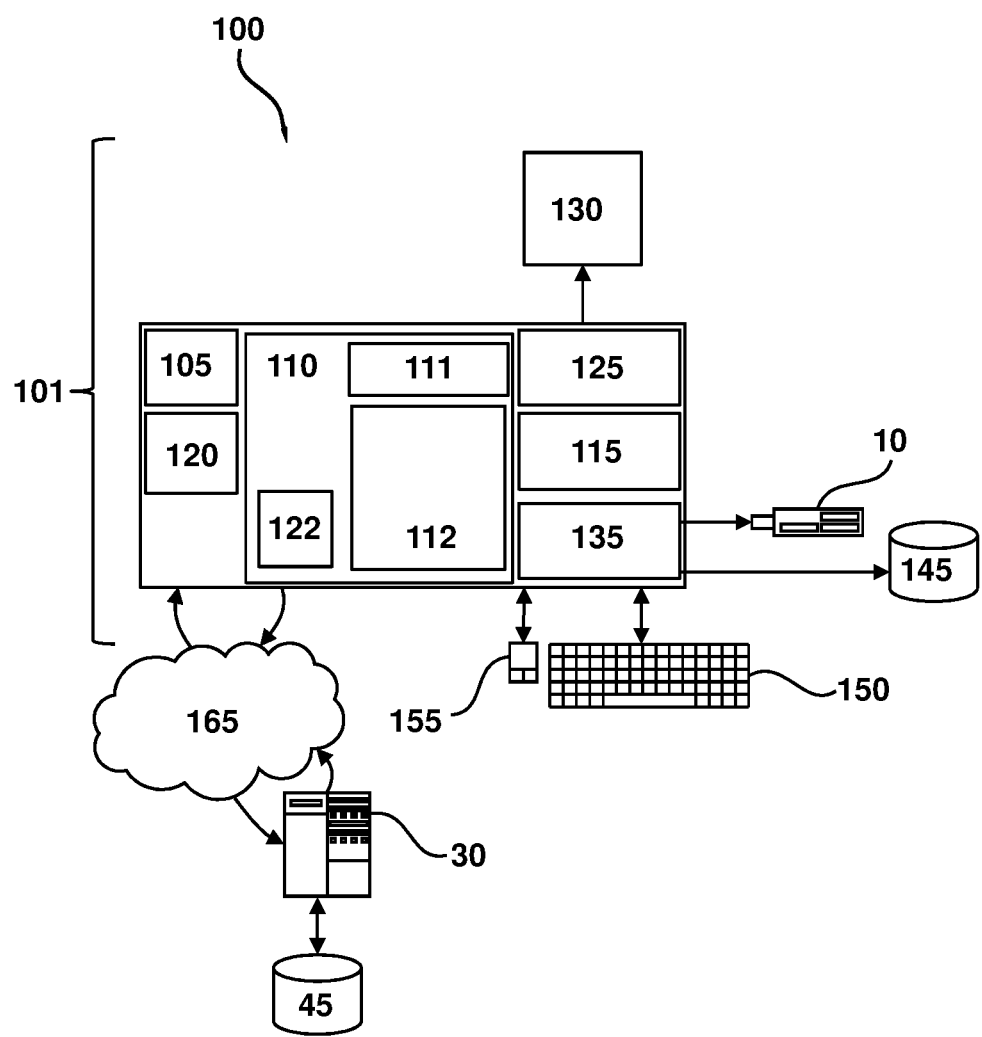
FIG. 1 depicts a first exemplary computer system suited for implementing the user authentication.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect that one or more delegated identities are provided. Each of the delegated identities is assigned to a particular authentication context. An authentication context may for example depend on a project or an organization to which resources a user tries to access are assigned. Granting access may depend on a successful authentication of the respective user. For each of the individual authentication context the user may always use his root identity for authentication. This corresponds to a single sign on with the root identity of the user for all the dedicated identities assigned to the respective root identity. The user may only be required to memorize and provide a root identifier and a credential comprised by the root identity. The root identifier may for example be provided in form of a username, the credential may for example be provided in form of a password.

Credentials refer to cryptographic credential, i.e. information which is used to establish the identity of a party to communication. This information is assumed to be only available to a specific, real individual or entity. A cryptographic credential may e.g. be provided in the form of a machine-readable cryptographic key, biometrics (e.g. fingerprints, voice recognition, retinal scans) and/or in form of a password. Credentials may be self-issued, or issued by a trusted third party; in many cases the only criterion for issuance is unambiguous association of the credential with a specific, real individual or entity. Credentials may be configured to expire after a certain period. Certificates, like an x.509 certificate, are further examples of credentials.

The authentication token issued in case of a successful authentication of the user using the root identity may only relate to the delegated identifier of the identified dedicated identity. The authentication token may e.g. be signed in order to prove its authenticity. No details about the underlying root identity are disclosed. The respective authentication token may be used by the user for proving a successful authentication. The recipient of the authentication token only learns about the delegated identifier of the user. Thus, from the viewpoint of the recipient, the user successfully with authenticated delegated identity. In order to prove the validity of the authentication token and its integrity, the same may be signed by the issuer of the authentication token, like e.g. an identity provider system. For signing the authentication token, the identity provider computer system may use a private cryptographic key assigned to the identity provider.

Embodiments may have the beneficial effect of providing for a plurality of different authentication contexts, e.g. different projects for different organizations, individual delegated identities of the user for each of the authentication contexts. The authentication context may for example be identified using a context indicator, like e.g. a URL via which the authentication request is provided.

A service provider computer system may provide services for different organizations. The respective services may be identical or organization-specific. The services may for example be cloud services. For accessing the services provided by the service provider, the user may for example use an organization-specific URL. Alternatively, the user may use a general URL and provide the authentication context by inputting an indicator indicating the organization for which or as a member of which he tries to access the service of the service provider. The respective indicator may for example be provided in form of an organization name.

Requiring approvals of additional delegated identities from further users on which the authentication contexts additional of the respective additional delegated identities depend may have the beneficial effect that an efficient test procedure is implemented. Successfully assigning the additional delegated identities may thus prove the dependencies of the respective additional delegated identities. Thus, delegated identities may depend on further root identities. The respective further root identity may for example be the root identity of a person or organization in context of which the additional delegated identity is used. The additional delegated identity may for example be the identity of a member of an organization with the further root identity. Thus, the additional delegated identity may only be assigned in case that the respective organization approves the additional delegated identity of the additional member.

According to embodiments, the method performs single-sign-on with the root identity of the user for all delegated identities assigned to the respective root identity. Embodiments may have the beneficial effect that for a plurality of different contexts different delegated identities may be used. The user may be enable to authenticate in each of these contexts using his root identity, while the root identity is not disclosed to the recipient of the authentication token, e.g. to the service provider to which the user authenticates.

According to embodiments, the root identity comprises more than one delegated identities assigned to the root identity. The more than one delegated identities are assigned to the root identity in form of a tree-structure with at least a first one of the more than one delegated identities assigned to the root identity via at least a second one of the more than one delegated identities.

Embodiments may have the beneficial effect that the delegated identities all depend on their assignment to the root identity. In case the root identity is revoked, all the delegated identities assigned to the respective root identity become invalid as well. The tree-like structure may furthermore have the beneficial effect that one or more of the delegated identities may be assigned to the root identity via other ones of the delegated identities. For example, a user may be provided with a delegated identity comprising a delegated identifier assigned to a specific organization as an authentication context. The respective organization may comprise one or more sub-organizations or affiliated organizations. For all or for a selection of the respective sub-organization or affiliated organizations, the user may be provided with further delegated identities assigned to the delegated identity of the respective organization. Thus, depending on the sub-organization for which a user intends to authenticate, he may use an individual delegated identity comprising a delegated identifier assigned to the respective sub-organization as an authentication context.

According to embodiments, the cryptographically secured register comprises computer-readable program code. Execution of the computer-readable program code by a processor of an authenticating computer system causing the processor to control the authenticating computer system to execute the user authentication and to issue the authentication token.

Embodiments may have the beneficial effect that the authentication may be executed by the authenticating computer system using the computer-readable program code provided by the cryptographically secured register. Thus, the computer system used for the authentication, i.e. the authenticating computer system is not required to comprise specific computer-readable program code in order to be enabled to execute the user authentication. The respective computer-readable program code is rather provided by the cryptographically secured register. The authenticating computer system may for example be an identity provider computer system. Embodiments may further have the beneficial effect that by providing the respective computer-readable program code by the cryptographically secured register, it may be ensured that the authentication is not corrupted by manipulations. Furthermore, the authentication may be executed by an arbitrary general computer system, which only is required to have access to the cryptographically secured register. In case of a distributed register, like a distributed block chain, access to an up to date copy of the cryptographically secured register may easily be gained.

According to embodiments, the cryptographically security of the register comprises one or more of the following: hashing, signing, and encrypting at least parts of the stored root identity and the stored one or more delegated identities.

Embodiments may have the beneficial effect that the identities stored in the respective register, i.e. root identities and delegated identities assigned to the respective root identities, may effectively be protected against manipulations. For example, the register may comprise a hash of each of the identities stored in the respective cryptographically secured register. Furthermore, the stored identities may be signed with a signing key, i.e. a cryptographic private key, of the user or entity which has generated and/or added the respective identity to the register.

For example, the register may be managed by one or more administrator computer systems. Each of the administrator computer systems may be assigned with a cryptographic private key for signing entries of the register comprising, i.e. root or delegated identities. Furthermore, the identities stored in the register may be encrypted. The identities may for example be encrypted with a symmetric cryptographic key or with a cryptographic public key. Thus, only the symmetric cryptographic key or the private cryptographic key assigned to the respective cryptographic public key may be required to decrypt these identities. The identities may for example all be encrypted with the same cryptographic key. According to further embodiments, identities may be encrypted with individual and/or different cryptographic keys. For example, all delegated identities assigned to the same authentication context may be encrypted with the same cryptographic key. According to embodiments, all the delegated identities assigned to the same root identity may be encrypted with the same cryptographic key.

According to embodiments, the cryptographically secured register is a distributed register, copies of which are distributed over a plurality of computer systems. Embodiments may have the beneficial effect, that using a distributed register may reduce the danger of a failure of the register. In particular a single point of failure may be prevented. As long as other copies of the register are still intact, the register may be re-established. Moreover, the workload for managing and/or maintaining the register may be distributed over the respective plurality of computer systems.

According to embodiments, the cryptographically security of the distributed register comprises storing the root identity and the one or more delegated identities in a plurality of blocks of a blockchain comprised by each copy of the distributed register. Embodiments have the beneficial effect of providing a tamper proof and shared infrastructure for managing the identities. This may provide an effective measure against manipulation of the stored identities.

A blockchain refers to a register comprising a list of records, so called blocks, which are linked and secured using cryptography. Each block may comprise a hash pointer as a link to a previous block, a timestamp identifying the time of generation of the respective block and data stored in the respective block. By design, blockchains may be inherently resistant to modification of the data stored in the blocks. A blockchain may serve as an open, distributed database that can record data efficiently and in a verifiable and permanent way. For use as a distributed register, a blockchain is e.g. managed by a peer-to-peer network collectively adhering to a protocol for validating additional blocks to be added to the blockchain. Once recorded, the data in any given block cannot be altered retroactively without the alteration of all subsequent blocks, which needs a collusion of the network majority.

A blockchain database may consists of two kinds of records: stored data and blocks. The blocks hold the stored data that is hashed and may e.g. be encoded into a Merkle tree. Each block may include the hash of the prior block in the blockchain, linking these two blocks. The linked blocks may form a chain. This iterative process may confirm the integrity of the previous block, all the way back to the first block of the blockchain, the so-called genesis block.

Blocks of a blockchain may also comprise executable program instructions, also referred to as smart contracts. The respective program instructions may be executed by a processor of a computer system in order to add an additional entry to the blockchain or in order to access information stored in the blockchain or in order to perform some other task defined by the blockchain. Providing executable program instructions using a blockchain may have the beneficial effect that the executable program instructions may be cryptographically secured against manipulation. Furthermore, the a distributed blockchain may provide an efficient way of distributing the respective program instructions. The executable program instructions may be verifiable, signed, and encoded in a programming language.

A blockchains may be secure by design and provide a distributed computing system with high Byzantine fault tolerance achieving a decentralized consensus.

According to embodiments, the blockchain may be shared among the different identification providers. The blockchain may be replicated such that each of the participant has a copy of the blockchain. It may be managed by a peer-to-peer network collectively adhering to a protocol for validating additional blocks to be added to the blockchain. Thus, the blockchain may have the beneficial effect of providing a tamper proof and shared infrastructure.

A consensus of the participants may be required for adding an additional entry to the blockchain. All participants may agree to the entry and validate it via the peer-to-peer network. According to embodiments, rules may be established to validate entries. These rules may for example be implemented by executable program instructions comprised by the blockchain itself. Embodiments may have the beneficial effect of enabling commitments with low workload based on a trusted and trustless participation. Entries may be encrypted, hashed, and sent to a network of validating nodes.

According to embodiments, the cryptographically secured register is provided by a central database. Embodiments may have the beneficial effect that a simple and reliable implementation of the register in form of the central database may be provided. According to embodiments, the central database may be a common database, which is cryptographically secured and auditable. The central database, comprising all the identities, may allow for linking arbitrary delegated identifiers into different contexts, like e.g. organizations.

According to embodiments, the issuing of the authentication token is refused if the root identity used for the authentication or the identified delegated identity is invalid.

Embodiments may have the beneficial effect that the authentication using any of the delegated identities may easily be prevented by invalidating the root identity to which the respective delegated identities are assigned. An invalidation may for example be performed by a revocation. Furthermore, an individual delegated identity may e.g. be revoked in case a user is not working anymore for an organization which provides the authentication context of the respective delegated identity. Furthermore, in case a delegated identity is invalid, all delegated identities assigned to the respective delegated identity, i.e. all delegated identities assigned to the root identity via the respective delegated identity, may be invalidated as well. In other words, issuing of the authentication token may be refused if the identified delegated identity is assigned to the root identity via a delegated identity which is invalid. Embodiments may have the beneficial effect that in case a person is not working for a specific organization anymore, not all of his identities used in context of the respective organization, i.e. when working for sub-organizations of the respective organization. It is rather sufficient, to invalidate, e.g. revoke, a delegated identity to which all the other delegated identities with the same authentication context, i.e. the respective organization, are assigned.

According to embodiments, the request comprises the root identifier of the root identity used for authentication. Embodiments may have the beneficial effect that the user may provide the root identity for each and every authentication independently of the actual delegated identity assigned to the respective authentication context.

According to embodiments, the request comprises the delegated identifier assigned to the root identity used for authenticating the user and assigned to the identified authentication context. Embodiments may have the beneficial effect that the request may provide the delegated identifier on its own. Thus, for example the delegated identity may be identified using the delegated identifier provided by the respective request.

According to embodiments, the authentication request is received by an identity provider computer system having access to the cryptographically secured register. The identity provider computer system performs the authentication of the user and the issuing of the authentication token identifying the successfully authenticated user by the delegated identifier of the identified delegated identity.

Embodiments may have the beneficial effect that the authentication of the user may be efficiently be executed by an identity provider computer system. Based on the authentication token issued by the respective identity provider computer system, the user is provided with the delegated identity of the delegated identifier comprised by the respective authentication token.

According to embodiments, the authentication request is received from a service provider computer system. The credential used for authenticating the user is received from a user computer system.

Embodiments may have the beneficial effect that the request may for example be received from a service provider computer system. For example, the request may be forwarded from the service provider computer system via a user computer system. For example, the user computer system may try to access a service provided by the service provider computer system and the service provider computer system may redirect the user computer system, e.g. a browser of the user computer system, to the identity provider computer system. In order to perform a successful authentication, the user computer system may furthermore provide the credential of the root identity of the user using the respective user computer system. In addition, the user computer system may provide the root identifier and/or the delegated identifier assigned to the authentication context in which the user tries to authenticate.

According to embodiments, the one or more delegated identities each comprise an indicator of a validity expiration date at which the validity of the respective delegated identity expires. Embodiments may have the beneficial effect that validity of the respective dedicated identities may be restricted in time. This may further enhance the security of the method, in particular of the delegated identities.

According to embodiments, at least one of the one or more delegated identities comprises additional authentication requirements for a successful authentication, in case the respective delegated identity is the delegated identity identified to be assigned to the root identity used for the authentication and assigned to the identified authentication context.

Embodiments may have the beneficial effect that delegated identities may comprise additional authentication requirements. Such additional authentication requirements may comprise additional passwords and/or a multi-factor authentication. For example, the security level of the respective delegated identity may be higher than other delegated identities. The security may be improved by requiring additional measures in order to successfully authenticate. The respective measurements may comprise for example providing a certificate comprising a cryptographic public key which is configured to prove the validity of signatures generated using the cryptographic private key assigned to the respective cryptographic public key comprised by the certificate.

According to embodiments, further a request for providing all delegated identities assigned the root identity is received from a first identity requester. All the one or more delegated identities assigned the root identity are provided if the first identity requester is successfully authenticated using the respective root identity.

Embodiments may have the beneficial effect that the delegated identities assigned to the root identity are visible in their entirety only for the root identity, i.e. the user authenticating with the respective root identity. All other participants, in particular the recipients of the authentication tokens, may only be aware of delegated identities assigned to a specific authentication context provided by the respective party.

According to embodiments, the additional authentication context depends on a further root identity via one or more further delegated identities assigned to the further root identity. Embodiments may have the beneficial effect that the delegated identity may for example depend on a further delegated identity of a sub-organization of the organization of the further root identity.

According to embodiments, the dependency of the additional delegated identity is implemented by the authentication context of the additional delegated identity, which comprises the further root identifier of the further root identity or a further delegated identifier of a further delegated identity assigned to the further root identity. Embodiments may have the beneficial effect that the dependency may be implemented by the authentication context, which may be provided in form of a root identifier or a delegated identifier of the root identity or delegated identity, respectively, the respective additional delegated identity depends.

According to embodiments, the identities may further comprise additional attributes defining the respective identity. For example, the attributes can define, whether the respective identity is the identity of a person or an organization. Furthermore, the attributes can define a role of the respective identity.

According to embodiments, further a request for providing all delegated identities depending on the further root identity is received from a second identity requester. All delegated identities depending on the further root identity are provided if the second identity requester is successfully authenticated using the further root identity.

Embodiments may have the beneficial effect that the depending delegated identities in their entirety may only be visible to the respective further root identity from which the delegated identities depend. For a delegated identity, which is assigned to the respective further root identity and from which one or more delegated identities depend only the depending delegated identities may be visible.

According to embodiments, the cryptographically secured register comprises further computer-readable program code. Execution of the further computer-readable program code by a processor of an assigning computer system causes the processor to control the assigning computer system to execute the assigning of the additional delegated identity to the root identity.

Embodiments may have the beneficial effect that the computer-readable program code for assigning the additional delegated identity to the root identity is provided by the cryptographically secured register and does not have to be provided by the computer system used for assigning the additional delegated identity. In other words, the respective additional delegated identity may be assigned using a general computer system which is only required to have access to the respective register.

According to embodiments, further the assigned additional delegated identity is invalidated by revocation. The revocation comprises receiving a request for revoking the additional delegated identity from a revocation requester. The revocation requester is authenticated. In case the revocation requester is the further user successfully authenticated using the further root identity on which the additional authentication context depends, a revocation indicator indicating the revocation of the additional delegated identity is added to the cryptographically secured register.

Embodiments may have the beneficial effect that an additional delegated identity may be revoked by the root identity on which it depends. For example, the respective root identity may be the root identity of an organization of which the additional delegated identity. Thus, the respective organization is enabled to revoke the additional delegated identity for example if the member leaves the organization.

Embodiments may enable cross company SSO, i.e. cross security domain SSO, while preserving the identity of the user and without requiring a mutual web of trust between all parties involved in the SSO. The users are not required to reveal their real identity, i.e. root identifier, to the service provider SP to which they want to authenticate, since the users may send their authentication details only to an identity provider which is backed by the cryptographically secured register, e.g. a blockchain.

The full set of delegated identities assigned to a root identity may only be visible to the owner of the root identity. Identities stored in the distributed register, i.e. blockchain, may be cryptographically secured and audited through the blockchain in order to distribute the burden of running a highly available authentication infrastructure between a plurality of parties.

According to embodiments, each identity is provided by a unique identity, e.g. a passport. Thus, each citizen owning a passport is provided with a root identity. The root identity may comprise a root identifier, e.g. the real name of the citizen, as well as a password assigned to the root identifier. In case, the citizen wants to authenticate, he may not be required to reveal this root identifier, i.e. real name. The root identity may rather enable him to do single sign-on using delegated identifier.

According to embodiments, the authentication and identification of the delegated identity may be executed by a single independent identity provider. According to embodiments the identity provider to execute the authentication and identification of the delegated identity may be selected from a plurality of plurality of identity providers, e.g. based on an authentication context.

According to embodiments, a single blockchain is provided. According to embodiments a plurality of blockchains may be provided. For example, each of the blockchains may be provided for a certain authentication context. Identity providers may trust a plurality of blockchains so that cross-company SSO is established. For example, the blockchains may be company-specific blockchains.

According to embodiments, the cryptographically secured register is embodied with non-volatile computer-readable storage medium and the computer-readable program code is comprised by the cryptographically secured register. According to embodiments, the computer-readable program code further is configured to implement any of embodiments of the method for user authentication using a cryptographically secured register descript herein.

According to embodiments, the computer system further is configured to execute any of the embodiments of the method for user authentication using a cryptographically secured register descript herein.

FIG. 1 depicts a computer system 100 suited for implementing a method for user authentication using a cryptographically secured register. It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112, e.g. configured to implement a user authentication using a cryptographically secured register.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. The software 112 may e.g. implement user authentication using a cryptographically secured register. When a source program, then the program needs to be translated via a compiler, assembler, interpreter, or the like, which may or may not be included within the memory 110, so as to operate properly in connection with the OS 111. Furthermore, the methods can be written as an object-oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The cryptographically secured register may be provided by a central database 45, 145. The central database may be a database 145 communicatively connected with the computer 101. Alternatively, the central database 45 may e.g. be provided by an external system 30 accessible via the network 165.

Figure 2:
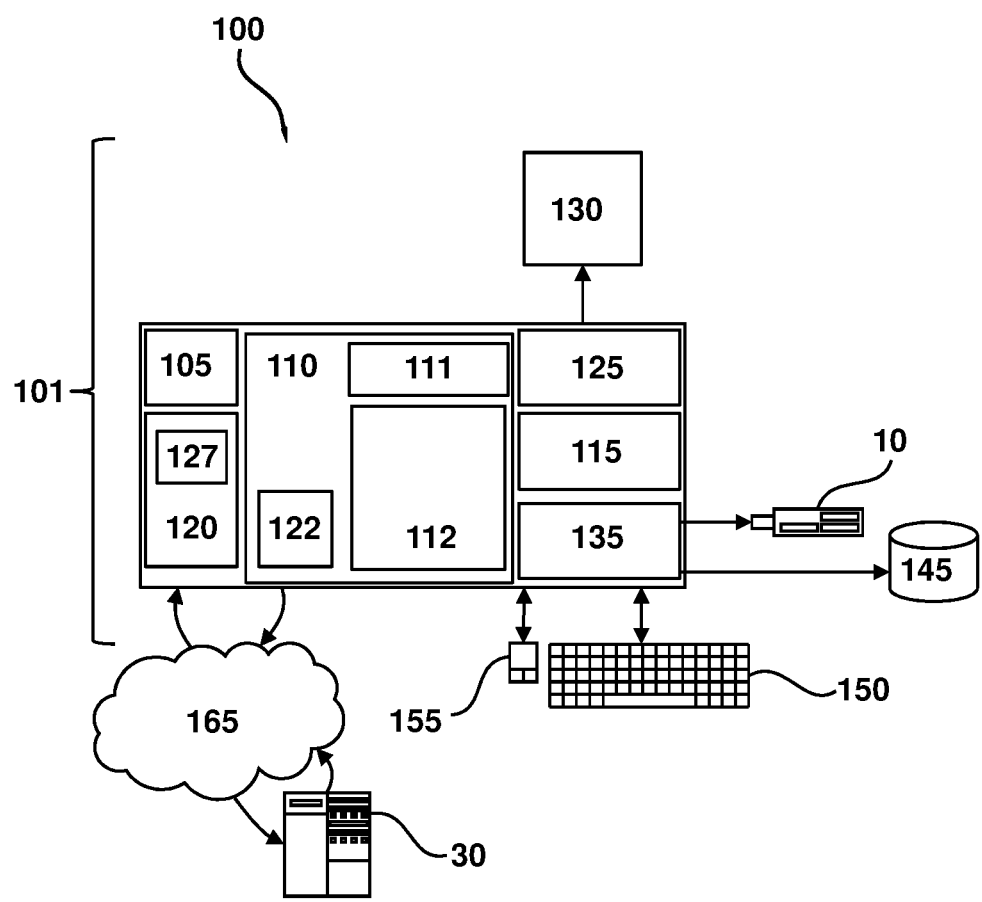
FIG. 2 depicts a second exemplary computer system suited for implementing the user authentication.

FIG. 2 depicts an alternative embodiment of computer system 100 suited for implementing a method for user authentication using a cryptographically secured register. In the embodiment according to FIG. 2, the cryptographically secured register is a distributed register comprising a blockchain. A copy 127 of the blockchain may be comprised by storage 120. The register may be distributed over a plurality of computer systems 30, 100. For example, the external system 30 may as well comprise a copy of the blockchain. According to embodiments, the network 165 may be used to manage the blockchain, e.g. to add additional blocks to the blockchain. According to embodiments, the network 165 may for example comprise a peer-to-peer network collectively adhering to a protocol for validating additional blocks of the blockchain.

Figure 3:
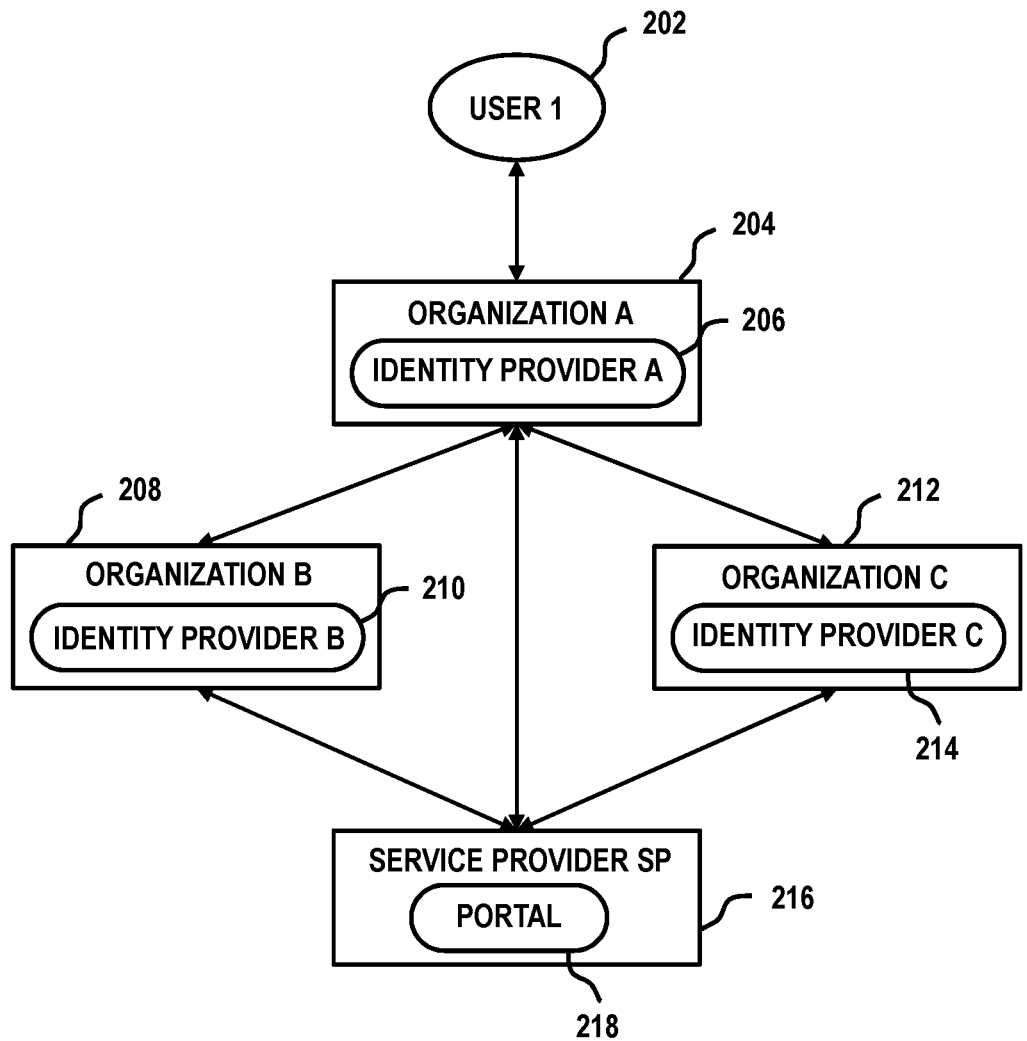
FIG. 3 depicts a schematic infrastructure implementing the user authentication.

FIG. 3 shows a schematic diagram of exemplary participants of a method for user authentication according to embodiments. For illustrative purposes, the following example may be considered: User 1 202 may be a member of a first organization A 204. Organization A 204 may comprise an identity provider 206 for authenticating members of organization A. Furthermore, there may be a second organization B 208 and a third organization C 212. Both organizations B and C 208, 212 may each comprise an identity provider, i.e. identity provider B 210 and identity provider C 214, respectively. The respective identity providers 210, 212 may be configured for authenticating members of organization B 208, organization C 212, respectively. Furthermore, there may be a service provider SP 216 comprising a portal 218, via which services provided by the respective service provider SP 216 may be accessed. Portal 218 may e.g. be a network interface for communicating with service provider 216 via the respective network.

For illustrative purposes, consider organization A to be e.g. an external supplier. Organization A may be a contractor of organization B as part of a first project PAB that user 1 is a member of. Organization A may further be a contractor of organization C as part of a second project PAC that user 1 is a member of as well. Both organizations B as well as C may use the service portal 218 provided by the service provider SP to manage their projects.

Embodiments may allow SSO to the services provided by the service provider SP for user 1 as part of the organization B project PAB and as part of the organization C project PAC using his organization A credentials. Thus, there is no need to build a mutual web of trust between the different identities, i.e. the service provider SP and organization B or organization C. In case of a mutual web of trust, the service provider SP and organization B would create a trust relationship between the identity provider B of organization B and the service provider SP to allow all organization B employees to perform SSO between organization B and the service provider SP. Further, the service provider SP and organization C would have to create a trust relationship between the identity provider C of the organization C and the service provider SP to implement the requirements to perform SSO between organization C and the service provider SP.

Allowing employees of organization A, like e.g. user 1, to access to a service provided service provider SP using the present method a couple of disadvantages compared to a mutual web of trust with trusted relationships between the service provider SP and organization B as well as between the service provider SP and organization C may be avoided.

Consider service provider SP and organization A creating a trust relationship between the organization A identity provider A and the service provider SP to allow employees of organization A to perform SSO between organization A and a service provided by provider SP. However, the service provider SP service would not be enabled to distinguish between user 1 working as part of the project PAB with organization B on the one hand and user1 working as part of the project PAC with organization C on the other hand. A permission for user 1 to access data related to project PAB with organization B as well as permission for user 1 to access data related to project PAC with organization C project would have to be stored in the service of provider service SP handling respective data of projects PAB and PAC. Therefore, provider service SP has to be able to handle the respective permissions.

User 1 may create a first additional local identity with the service provider SP for project PAB with organization B and a second additional local identity for project PAC with organization C, which is different from the first additional local identity. A local identity refers to a project-specific identity, which is restricted to the respective project. The respective local identities are created in addition to user 1's identity as an employee of organization A, which enables user 1 to access data related to organization A.

However, user 1's three identities would are disconnected. Consequently, user 1 would be unable to perform SSO. Furthermore, it may become hard to ensure security policies to be consistently applied, auditing being done in a uniform way and access rights being revoked at the right time etc.

Please note, in general it is not possible to have organization B or organization C create a trust relationship to organization A federating user 1 into their organization. As there would only remain user 1, i.e. one identity with one identifier of user 1, respectively, the service provider SP would be unable to distinguish which identity provider, i.e. identity provider B of organization B or identity provider C of organization C, may be responsible for authenticating the user. Thus, it would be unable decide to which of the identifier the authentication request should be send.

In contrast, embodiments according to the present disclosure may provide an effective approach for replacing the web of trust required by known SSO solutions with a different mechanism. User 1 may access the service provider portal 218 via a computer system of organization A or via a URL for accessing portal 218 related to organization A. In both cases, user 1 may use a root identity for authenticating. The authentication may be executed by identity provider A accessing a cryptographically secured register. The cryptographically secured register may e.g. be implemented as a blockchain and a first copy of the blockchain may be comprised by identity provider A. For example, in case of a successful authentication, an authentication token comprising a delegated identifier of a delegated identity A is provided, which identifies user 1 as a member of organization A. Thus, user 1 is enabled to perform an authentication using the issued authentication token for organization A.

Alternatively, user 1 may access the service provider portal 218 via a computer system of organization B or via a URL for accessing portal 218 related to organization B. This may be done in order to perform a task as a member of project PAB. Again user 1 may use the root identity for authenticating. This time, the authentication may be executed by identity provider B accessing a second copy of the blockchain comprised by identity provider B. For example, in case of a successful authentication, an authentication token comprising a delegated identifier of a delegated identity B is provided, which identifies user 1 as a member of organization B. Thus, user 1 is enabled to perform an authentication using the issued authentication token for organization B.

Furthermore, user 1 may access the service provider portal 218 via a computer system of organization C or via a URL for accessing portal 218 related to organization C. This may be done in order to perform a task as a member of project PAC. Again user 1 may use the root identity for authenticating. This time, the authentication may be executed by identity provider C accessing a third copy of the blockchain comprised by identity provider C. The cryptographically secured register may e.g. be implemented as a blockchain and a copy of the blockchain may be comprised by identity provider C. For example, in case of a successful authentication, an authentication token comprising a delegated identifier of a delegated identity C is provided, which identifies user 1 as a member of organization C. Thus, user 1 is enabled to perform an authentication using the issued authentication token for organization C.

Depending on the homepage via which user 1 tries to access portal 218 or depending on which service account he tries to access, identity provider B or identity provider C may be requested to authenticate user 1

Figure 4:
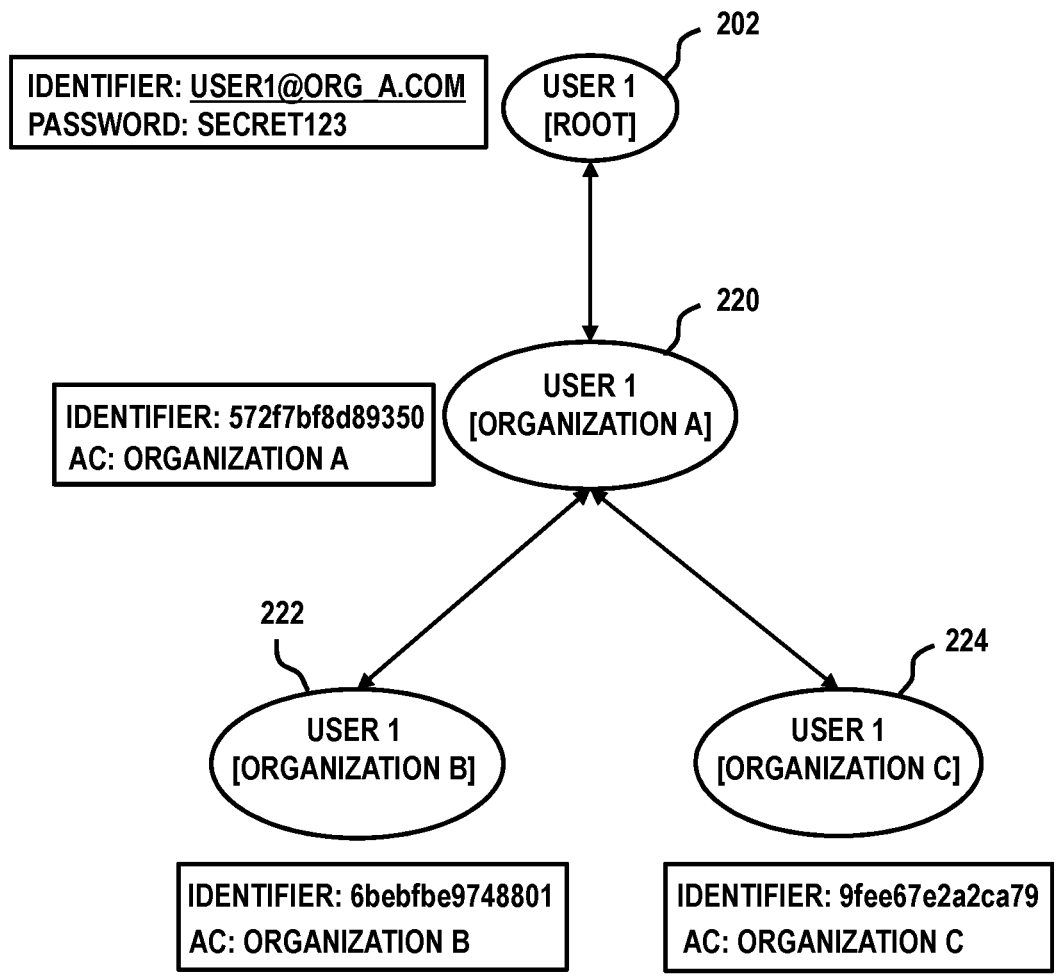
FIG. 4 depicts a schematic diagram of an exemplary assignment of delegated identities.

FIG. 4 shows a schematic diagram of a tree-like structure of delegated identities 220, 222, 224 assigned to the root identity 202 according to the example of FIG. 3. The root identity 202 comprises a root identifier "user1@org_a.com" and a password "secret123". The delegated identity 220 comprises a delegated identifier "572f7bf8d89350" assigned to organization A as an authentication context. The delegated identities 222 and 224 are assigned to the root identity 202 via the delegated identity 220. The delegated identity 220 comprises a delegated identifier "6bebfbe9748801" assigned to organization B as an authentication context. The delegated identity 222 comprises an identifier "9fee67e2a2ca79" assigned to organization C as an authentication context.

Considering the example of FIG. 3, privacy and context sensitivity may cause further concern. User 1 accessing the service provided by provider SP in the context of organization B, i.e. the project PAB, should use a different identifier than user 1 accessing the service of provider SP in the context of organization C, i.e. the project PAC, to ensure separation of duties, permissions and span of control. Thus, as shown in FIG. 4 for different contexts in which the root identity 202 is used for authentication, different delegated identities 202-224 are used which are each unique to one of the contexts. Thus, the root identity remains unknown to all systems leveraging the delegated identifier of the delegated identities 220-224 for SSO.

The root identity 202 that comprises an identifier and password for login which user 1 uses in any SSO login. As the SSO login is executed in the context of the realm of the application that requests access, the SSO login may determine if user 1 is trying to login in the context of organization B, i.e. the project PAB, or in the context of organization C, i.e. the project PAC. After successfully authenticating user 1 using the root identity 202 and either finding or creating the delegated identifier of user 1's organization B identity 222 "user 1 [organization B]" or of user 1's organization C identity 224 "user 1 [organization C]", the respective identifier of organization B identity 222 or organization C identity 224 is returned to the service provider SP.

For the service provider SP there is no relation between identifier of organization B identity 222 and identifier of organization C identity 224. Both identifiers appear to refer to different identities of two different users, each being part of their respective realm organization B or organization C.

Figure 5:
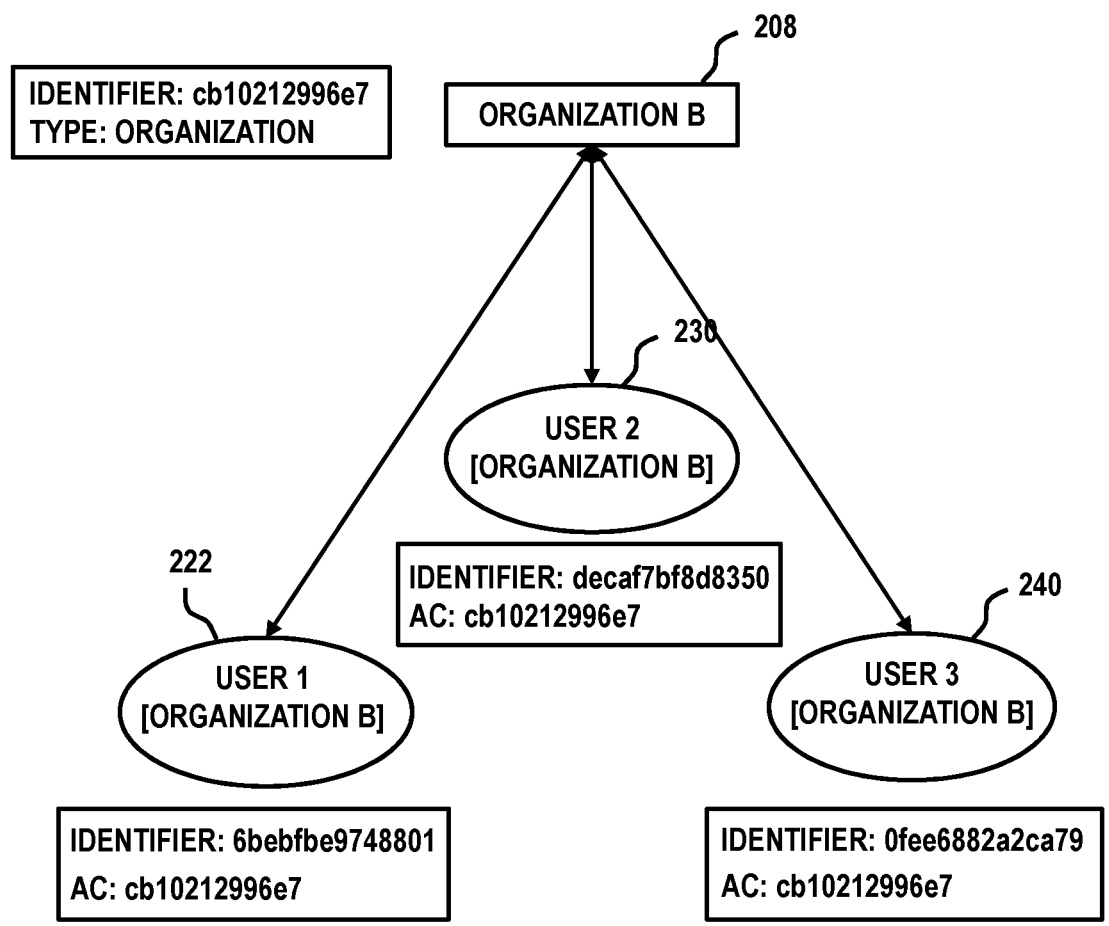
FIG. 5 depicts a schematic diagram of an exemplary dependency of delegated identities.

FIG. 5 shows an identity 208 of organization B, which may either be a root identity or a delegated identity assigned to a root identity. Identity 208 comprises an identifier "cb10212996e7" and an attribute "type: organization". The attribute indicates that identity 208 belongs to some organization. A plurality of delegated identities 222, 230, 240 may depend on root identity 208 of organization B. The dependency of the delegated identities 222, 230 and 240 may be implemented by the authentication contexts of the respective delegated identities 222, 230, 240 which is provided by the organization B, e.g. in form of its identifier. The authentication contexts of delegated identities 222, 230, 240 is e.g. "cb10212996e7". Each of the delegated identities 222, 230, 240 may comprise a delegated identifier.

During a login of user 1 to services of the service provider SP provided for organization B, the SSO service needs to determine, if user 1 is authorized as member of the realm he tries to access, i.e. organization B. Consider user 2 230 and user 3 240 to work directly for organization B and having no relations to organization A, i.e. no organization A identity. User 1 creates the delegated identities 222 with delegated identifier "6bebfbe9748801" for organization B. By selecting the authentication contexts to be provided by or linked to identifier "cb10212996" of organization B the dependency between delegated identities 222 and identity 208 of organization B. The service provider SP authorizes all users assigned to organization B's realm to logon by binding the organization's identity, i.e. identifier, to the respective project PAB.

Thus user 1 may login to a service provided by service provider SP always using his organization A identifier and password, while his identity will be surfaced to the service of service provider SP correctly, depending on the context in which user 1 tries to login. Unnecessary complexity in the service of the provider SP is avoided, because from the perspective of the service provider SP, there are two different user 1 identities. Organization B and organization C each controls independently, if user 1 can login to the part of the service of provider SP service within their directory, applying the same principles as if user 1 would be a real employee of organization B and organization C, respectively.

Figure 6:
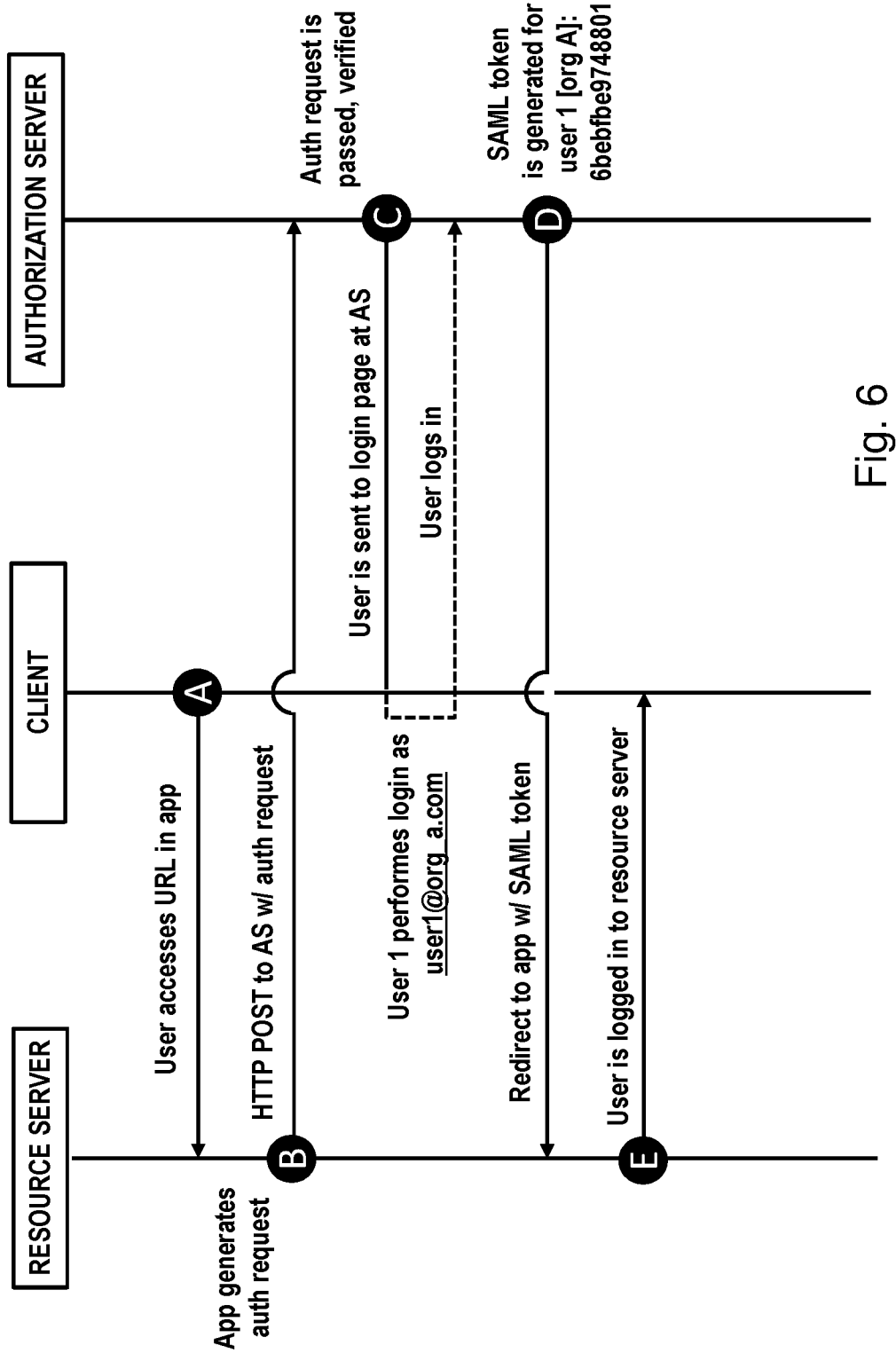
FIG. 6 depicts a schematic flow diagram of an exemplary user authentication.

FIG. 6 shows a schematic diagram of an exemplary communication process between a client, e.g. a web browser executed by a user computer system, a resource server, e.g. a service provider computer system, and an authorization server, e.g. an identity provider computer system. In step A the client accesses a URL in an application running on the client. The URL may reference to a service provided by the service provider for organization B. When accessing the respective URL, the application generates an authentication request. The authentication request for authenticating the user of the client is sent to the authorization server, e.g. using HTTP post. The authentication request is passed and verified by the authorization server. In step C the authorization server redirects the client to a login page of the authentication server. The user performs a login with his root identity. The authentication server authenticates the user and identifies the delegated identity assigned to the authentication context, i.e. organization B, using the cryptographically secure register. For example, the authentication context depends on the URL the user accesses in the application. In step D an authentication token is generated, e.g. in form of a SAML token, for the delegated identity of the user. In step D the application is redirected to the resource server with the authentication token. In step E the user is logged into the resource server an authentication token confirming a valid authentication for the delegated identity identified by the respective an authentication token. Thus, the user is able to access the service provided by the resource server for organization B.

The cryptographically secure register may be implemented in form of a blockchain comprising all identities, like e.g. root identities, delegate identities of users as well as identities of the organizations, stored the blocks of the blockchain. The identity provider may execute computer-readable program code stored in the blockchain as well. Due to an execution of the respective computer-readable program code the delegated identity for the authentication context in question may be returned, if the password is correct and the identity is allowed to access. For example, the computer-readable program code may define:
delegatedIdentity=getIdentity(authentication context, rootID, root password)

According to alternative embodiments, the service provider SP may run a single identity provider which is connected to the blockchain and responsible for authorizing any user login for all the realms that have resources provided by the service provider SP, like e.g. organization C and organization B. According to alternative embodiments, a single independent identity provider may be provided which is connected to the blockchain and responsible for authorizing any user login for all the realms that have resources provided by the service provider SP, like e.g. organization C and organization B.

Figure 7:
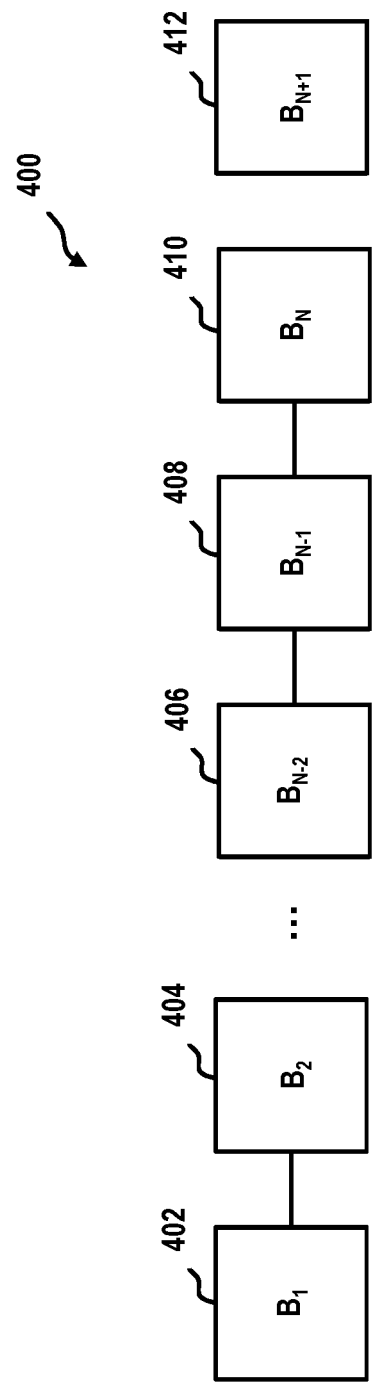
FIG. 7 depicts a schematic diagram of an exemplary blockchain.

FIG. 7 shows a schematic diagram of an exemplary blockchain 400 used for storing identities. The stored identities may comprise root identities as well as delegated identities. According to embodiments there may be categories of identities, like e.g. identities of persons and entities. Blockchain 400 comprises a plurality of blocks B1 to BN 402-410. Each block B2 to BN 404-410 includes the hash of the prior block B1 to BN−1 402-408 in the blockchain 400, thereby linking the two. In order to amend one of the blocks B1 to BN 402-410, the hashes of all the following blocks would have the be amended as well. In case additional data is to be stored in the blockchain 400, an additional block BN+1 412 comprising the additional data is generated and added to blockchain 400 by linking it with the last block BN 410. Linking block BN+1 412 with block BN 410 may comprise adding the hash of block BN 410 to block BN+1 412. Blocks B1 to BN 402-410 and in particular the first blocks of blockchain 400 may comprise computer-readable program code. An execution of the computer-readable program code by one of the electronic data processing tools may cause an execution of the user authentication using the identities stored in the blockchain and an issuing of the authentication token. The computer-readable program code may in particular be configured identify a delegated identity which is assigned to the root identity of the user as well as to an authentication context identified for the authentication request.

Confidentiality of the different identities comprised by the same blockchain 400 may be implemented by restricting the read access to the data stored in the blocks B1 to BN 402-410 of blockchain 400. Such a restriction of read access may e.g. be implemented by encrypting the data stored in blockchain 400 with different encryption keys.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Possible combinations of features described above can be the following:

What is claimed is:

1. A computer-implemented method for user authentication using a cryptographically secured register, the cryptographically secured register comprising a root identity of the user, the root identity comprising a root identifier and a credential assigned to the root identifier for authenticating the user, the cryptographically secured register further comprising one or more delegated identities assigned to the root identity, each of the delegated identities comprising a delegated identifier and being assigned to an authentication context, the method comprising:

receiving an authentication request for authenticating the user, authenticating the user using the root identity of the user, a successful authentication requiring receiving the credential assigned to the root identifier of the root identity of the user, identifying an authentication context of the requested authentication, identifying one of the one or more delegated identities assigned to the root identity of the user and assigned to the identified authentication context using the cryptographically secured register, in response to a successful authentication of the user using the root identity, issuing an authentication token confirming the successful user authentication and identifying the authenticated user by the delegated identifier of the identified delegated identity, wherein the root identity includes more than one delegated identities assigned to the root identity, the more than one delegated identities being assigned to the root identity in form of a tree-structure with at least a first one of the more than one delegated identities assigned to the root identity via at least a second one of the more than one delegated identities.

2. The method of claim 1, the method performing single-sign-on with the root identity of the user for all delegated identities assigned to the respective root identity.

3. The method of claim 1, the cryptographically secured register comprising computer-readable program code, execution of the computer-readable program code by a processor of an authenticating computer system causing the processor to control the authenticating computer system to execute the user authentication and to issue the authentication token.

4. The method of claim 1, the cryptographically security of the register comprising one or more of the following: hashing, signing, and encrypting at least parts of the stored root identity and the stored one or more delegated identities.

5. The method of claim 1, the cryptographically secured register being a distributed register, copies of which are distributed over a plurality of computer systems.

6. The method of claim 5, the cryptographically security of the distributed register comprising storing the root identity and the one or more delegated identities in a plurality of blocks of a blockchain comprised by each copy of the distributed register.

7. The method of claim 1, the cryptographically secured register being provided by a central database.

8. The method of claim 1, the issuing of the authentication token being refused if the root identity used for the authentication or the identified delegated identity is invalid.

9. The method claim 1, the request comprising the root identifier of the root identity used for authentication.

10. The method of claim 1, the request comprising the delegated identifier assigned to the root identity used for authenticating the user and assigned to the identified authentication context.

11. The method claim 1, the authentication request being received by an identity provider computer system having access to the cryptographically secured register, the identity provider computer system performing the authentication of the user and the issuing of the authentication token identifying the successfully authenticated user by the delegated identifier of the identified delegated identity.

12. The method of claim 11, the authentication request being received from a service provider computer system and the credential used for authenticating the user being received from a user computer system.

13. The method of claim 1, the one or more delegated identities each comprising an indicator of a validity expiration date at which the validity of the respective delegated identity expires.

14. The method of claim 1, at least one of the one or more delegated identities comprising additional authentication requirements for a successful authentication, in case the respective delegated identity is the delegated identity identified to be assigned to the root identity used for the authentication and assigned to the identified authentication context.

15. The method of claim 1, further comprising
receiving from a first identity requester a request for providing all delegated identities assigned the root identity,
providing all the one or more delegated identities assigned the root identity if the first identity requester is successfully authenticated using the respective root identity.

16. The method of claim 1, further comprising assigning an additional delegated identity to the root identity, the additional delegated identity comprising an additional delegated identifier and being assigned to an additional authentication context, the additional authentication context depending on a further root identity, the assigning comprising:
receiving a request for assigning the additional delegated identity,
checking the additional authentication context of the additional delegated identity,
in case the additional authentication context depends on the further root identity, storing the additional delegated identity assigned to the root identity in the cryptographically secured register in response to receiving an approval of the additional delegated identity from a further user successfully authenticated using the further root identity on which the additional authentication context depends.

17. The method of claim 16, the additional authentication context depending on a further root identity via one or more further delegated identities assigned to the further root identity.

* * * * *